United States Patent
Brudner

[15] 3,654,708
[45] Apr. 11, 1972

[54] COMPUTER-ASSISTED INSTRUCTION VIA VIDEO TELEPHONE

[72] Inventor: Harvey J. Brudner, Piscataway, N.J.
[73] Assignee: Westinghouse Learning Corporation, Iowa City, Iowa
[22] Filed: May 26, 1969
[21] Appl. No.: 827,868

[52] U.S. Cl. ............................35/9 A, 179/2 TV, 340/172.5
[51] Int. Cl. ..................................G09b 7/04, H04m 11/00
[58] Field of Search ..................35/8, 8.1, 9, 35.3; 340/172.5; 179/2 DP, 2 TV

[56] References Cited

UNITED STATES PATENTS

| | | | |
|---|---|---|---|
| 3,408,749 | 11/1968 | Brudner | 35/9 A |
| 3,504,447 | 4/1970 | Brudner | 35/9 B |
| 3,061,670 | 10/1962 | Oster et al. | 179/2 TV UX |
| 3,263,027 | 7/1966 | Beltrami | 179/2 TV UX |
| 3,344,401 | 9/1967 | MacDonald et al. | 179/2 DP UX |
| 3,381,276 | 4/1968 | James | 179/2 DP UX |
| 2,787,669 | 4/1957 | Flan et al. | 35/8 A UX |
| 2,975,672 | 3/1961 | Shields | 35/35 C UX |
| 3,075,178 | 1/1963 | James | 340/172.5 |
| 3,405,457 | 10/1968 | Bitzer | 35/9 |

OTHER PUBLICATIONS

American Telephone and Telegraph Co. Information Department Release dated Feb. 5, 1969 pages 1 and 4

*Primary Examiner*—Wm. H. Grieb
*Attorney*—Kenyon & Kenyon Reilly Carr & Chapin

[57] ABSTRACT

A teaching system utilizing a video telephone as a terminal in which the video telephone is tied into a computer whereby information is fed into the video telephone and other information is returned to the computer. A video tape recorder, containing a central bank of pre-recorded reels of video tape, is connected to the central processing unit of the computer and the video telephone whereby pictorial representations as distinguished from the alpha-numerical representations will appear on the screen of the video telephone enabling interaction with the student. This central bank of pre-recorded reels of video tape is connected to a buffer unit so that selected tape reels can be transfer recorded into the buffer unit where it is played back to the student selecting such tape. In this manner, the pre-recorded reels of video tape in the central bank will be available almost simultaneously to a large number of students at different terminal units in the teaching system.

10 Claims, 3 Drawing Figures

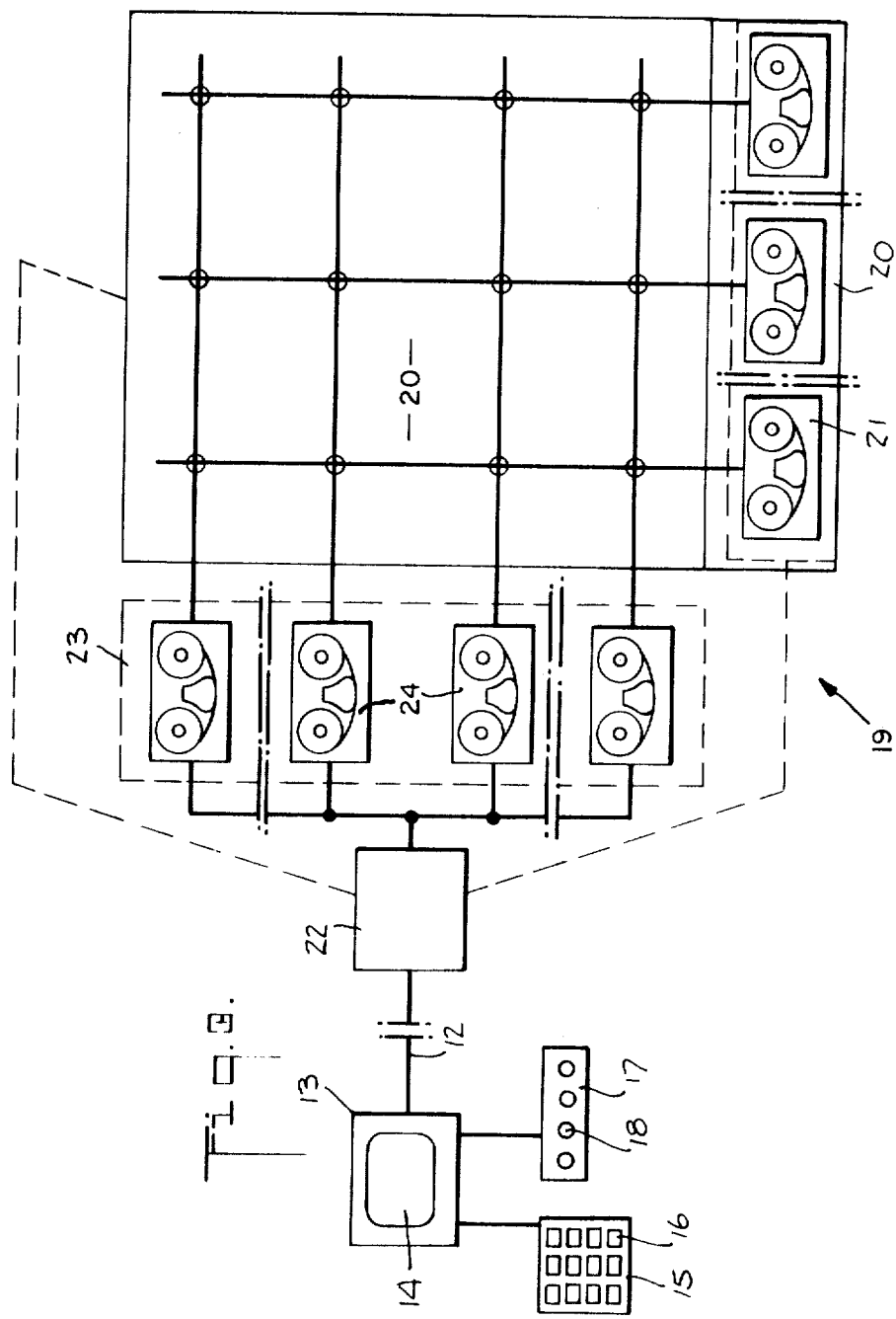

COMPUTER-ASSISTED INSTRUCTION VIA VIDEO TELEPHONE

BACKGROUND OF THE INVENTION

The computer has achieved a great deal of success as an aid to the teaching profession. It has proved to be an excellent tool in the learning process.

Basically the computer has aided the teaching profession by being applied to two different systems of approach. In the one system termed computer-managed instruction or CMI the computer functions to help the instructor to administer and guide the instructional process, but relies on separate hardware and learning materials. The student is usually not on line with the computer system. The instructional materials in the computer-managed instruction system are not stored in the computer. The system permits the teacher to observe the progress of students more closely and to assist in their development.

Another system of computer teaching is termed computer-assisted instruction, or "CAI." In this system, the student participates with the computer directly and the instructional materials are stored in the computer system. In this system each student has his own terminal and questions are posed by material which had previously been programmed into the computer. The student then answers the questions, and thus, the learning process takes place. Most of the time, the computer presents information in the alpha-numeric mode.

It has been found that computer-assisted instruction is extremely expensive because of the tremendous number and high price of special terminal units which are required.

Another disadvantage of the computer-assisted instruction system is that it is not readily available outside of the learning institution. Thus, if a student is ill and forced to remain at home, he cannot benefit from the learning experience encountered at the institution where the computer terminals are based.

The basic systems also have the inherent disadvantage in the type of information which can be presented. Present systems allow mainly the alpha-numeric mode which encompasses only written material as distinguished from full audio-visual mode providing pictorial and sound representations.

SUMMARY OF THE INVENTION

Bearing the above in mind, I have developed an entirely new computer teaching technique which will utilize an existing system of terminal units which are available to businesses, institutions and home owners and is adapted to present information in the alpha-numeric as well as audio-visual modes at minimal expense.

Basically, in one form software information is fed into a central processing unit such as a Univac 494 computer. Information in alpha-numeric form may be stored in peripheral equipment such as a Univac Fastrand Storage Drum. A plurality of telephones are video linked with a time-shared interface as the Univac 494 and the AT&T "CIM" receiver unit which serves as a central control. Messages are received on the video telephone and the student can respond to these messages. In the event a question is presented, the student responds by pressing a predetermined response device associated with the terminal unit. If his response is correct, the computer proceeds with additional information or questions to the student. If the response is incorrect, the computer can supply the student with additional material to aid his understanding. When the student has proved his understanding of the subject matter, he can proceed.

The invention also contemplates the use of a video tape recorder connected to the central processing unit and containing a central bank of pre-recorded reels of video tape which will enable the student to see audio-visual representations of objects, and he can also see and hear an instructor. The central bank of pre-recorded reels of video tape is connected to a buffer unit containing video tapes for transfer recording the video information from selected reels of video tape into the buffer unit, thereby permitting the pre-recorded reels in the central bank to be made available almost simultaneously to a large number of students at different terminal units located around the central processing unit. The learning process would the proceed as outlined above.

A better comprehension of the invention in its more detailed aspects will be obtained from consideration of the embodiment illustrated in the drawing and described hereinafter. Obviously, the principle of operation may be implemented in a variety of ways, and may be used for a variety of purposes known to those skilled in the art.

BRIEF DESCRIPTION OF THE DRAWING

FIG. 3 is a schematic diagram showing details of the FIG. 2 embodiment.

DESCRIPTION OF THE PREFERRED EMBODIMENT

Figure 1:
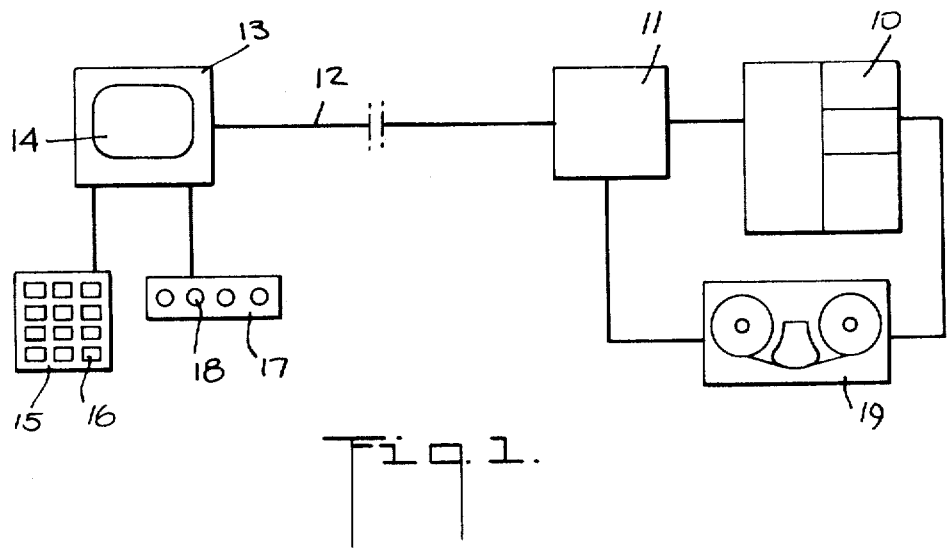
FIG. 1 is a schematic block diagram depicting the elements of the teaching system.

Referring to Figure 1, an electronic data processing machine 10 such as a Univac 494 computer or any other known compatible unit has alpha-numeric information stored therein in the form of information to be presented to students. Such alpha-numeric data may be inserted via a CRT input device such as the RCA Spectra 70/752 unit. A receiver 11 is connected via usual telephone switching with the computer 10. The receiver is a time-shared interface and receiver unit which functions to translate the information fed to it by the computer and video tape into video and audio signals relayed to the video telephone 13 such that useful information is presented to a student having the video telephone before him. The receiver 11 also receives signals initiated by the student giving responses to questions and this information is returned to the computer 10.

A transmission line 12 in the range of generally 1 megacycle is connected to the receiver 11 at one end and to a video telephone 13 at the other end. The video telephone is a known device one version of which is marketed by American Telephone & Telegraph Co. under the tradename "Picturephone." The video telephone 13 includes a screen 14, upon which information is presented and can be viewed. The video telephone is basically a receiver for audio and visual signals. A control panel 15 having buttons 16 thereon is connected to the video telephone such that the student can send his responses back to the computer to establish an instructional pattern. A control panel 17 is also used with the video telephone to energize the latter, and control the video and audio responses. Thus, a student is seated in front of the screen 14 on the video telephone 13. The control unit 17 is actuated and the student manipulates the dials 18 thereon to properly tune in the teaching channel and to select the subject matter of the lesson to be taught. Generally when the subject has been chosen, such as Physics, the computer 10 which has a Physics lesson programmed therein via a video tape recorder connected to such computer 10 in a manner to be explained hereinafter, activates the control receiver unit 11 which sends the Physics lesson in a serial-timed manner over the transmission line 12 to the video telephone 13. As the lesson progresses, instructional material is followed by a question. The student must answer the question so that his grasp of the previously presented material can be evaluated. The response may be multiple-choice, a spelled out alpha-numeric response, or selection of several items from a response matrix. The student presses the response buttons 16 indicating what he believes the answer to the question is. The question presented appeared on the screen 14 after a portion of the lesson was presented. If the student's response was correct, the computer sends additional learning material to the student. If, on the other hand, the student's response was incorrect, then that portion of the lesson is reviewed with the student along with an additional material which may be programmed into the computer. As soon as the student has grasped the subject matter as indicated by his response to various questions, the computer will send additional material to the student. The control panel 15 can be of any desired construction, however, one particularly useful panel is disclosed by the present inventor in a copending application filed May 31, 1967, Ser. No. 642,491 entitled "Answer System For Teaching Machines" (now U.S. Pat. No. 3,504,447), issued to Harvey J. Brudner on Apr. 7, 1970. In this patent there is disclosed a motion-picture teaching machine which includes a student keyboard and control panel, and a viewing screen, which operate in a manner similar to the video telephone 13 having the viewing screen 14, the control panel 15 and buttons 16, shown in each of the FIGS. 1–3. The keys or actuators of the student keyboard are marked in a manner generally similar to the marking of a touch-type telephone keyboard.

A video tape recorder 19 is introduced into the teaching system as depicted in Figure 1. By utilizing a video tape recorder, the student receives not only alpha-numeric messages but also receives pictorial representations. In using the video tape recorder, the control receiver unit 11 picks up a signal from the tape recorder 19 in accordance with a computer signal and sends the signal over the transmission line 12 to the video telephone 13. By utilizing a video tape recorder, the capability of the teaching system is greatly expanded. For example, rather than a pure theoretical discussion of a Physics principle, such as Bernoulli's theorem, the student can actually be shown an example of the experiment, which, of course, renders the learning process more meaningful. A more personal approach to the teaching can be obtained because an instructor can also be viewed on the screen 14 to provide authoritative verbal emphasis and expression directly to the student.

In the U.S. Pat. No. 3,408,749 issued on Nov. 5, 1968 to the present inventor, Harvey J. Brudner, and entitled "Branching Instruction Teaching Device," there is disclosed an audio-visual teaching device which is similar in many respects to the teaching system of the present invention, the differences of which will be apparent from the description to follow. In this patent, the teaching device includes (a) a viewing screen, and (b) sound pickup and amplification devices for optically projecting a motion picture film image on the screen and reproducing audio information carried by the film through a loudspeaker, similar to the video telephone 13 and screen 14 shown in the FIGS. 1–3 of the present specification. The teaching device also includes (c) operating controls and (d) student response buttons, respectively similar to the dials 18 on control unit 17, and the student response buttons 16 on control panel 15 shown. According to this patent, a control system is provided having a control and drive mechanism for the motion-picture film, means for selecting the appropriate film tracks employed for the coding of various information, means for detecting the coded information on the film tracks, and a comparator circuit for comparing the student's answers with the correct answers as provided on the film and actuating a selector to exhibit the corrective film sequence based on the student's answer. This control system is very similar in basic operation to the computer 10 and control receiver 11 shown in Figure 1. That is, such control system functions to receive signals initiated by the student relating to responses to questions, compares the received signal information with stored data, and logically selects the appropriate system response to send back to the student, whether it be sending certain additional learning information to the student or proceeding on to a new question or subject on the main lesson series track. The teaching device disclosed in this patent operates with motion picture film, video tape or other forms of visual media.

Figure 2:
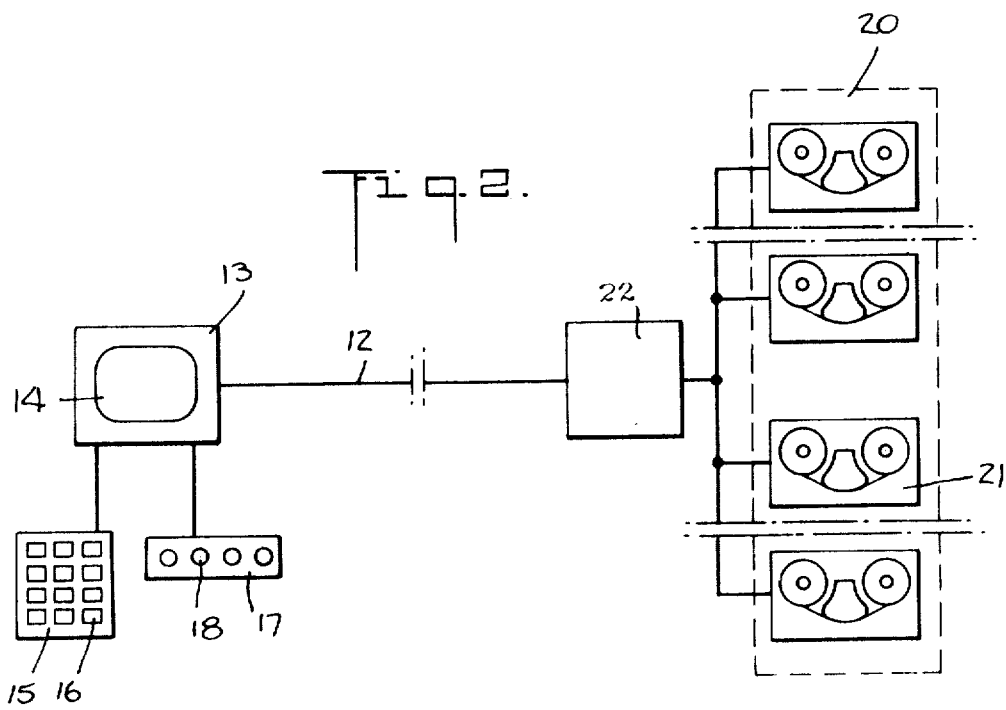
FIG. 2 is a schematic diagram showing details of the FIG. 1 embodiment.

To further refine the use of a video tape recorder with the present teaching system there is shown in Figure 2 a central bank 20 of pre-recorded reels of video tape associated with a computer and a control unit. The individual reels 21 have subject matter recorded thereon such as Algebra I, Physics 41, History 54, etc. The student chooses a subject by depressing the appropriate button 16 on his control panel 15. Assuming he chooses Algebra I, a signal is sent to a switching unit 22 which selects the Algebra I video recording. The video recording is then transmitted via the transmission line 12 to the video telephone 13. Assuming that a plurality of students choose Algebra I at the same time, a signal is sent to the students indicating that such a tape is being used. In this case, by means of high speed transfer, the video recording of Algebra I on one of the tapes of tape reels 21 in the central bank 20 is transfer recorded on one of the video tapes 24 located in a buffer unit 23 in approximately 30 seconds so that additional video recordings can be made available simultaneously to a number of students. (See FIG. 3) In this fashion, the video recording on one of the master tape reels 21 in the central bank 20, is transfer recorded on one of the video tapes 24 in the buffer unit 23 upon being selected by a student so that the student directly receives information stored in the buffer unit 23 rather than tying up the tape reels 21 located in the central bank 20.

Naturally, each student has a different learning capacity and learning rate from other students. In this regard, the magnetic video tapes employed herein can have two or more tracks sequenced in opposite directions on the same longitudinal portion of the tape to form a "loop" which both commences and ends at the point where the main series is interrupted for its presentation. This loop-format technique is fully disclosed in the above-mentioned U.S. Pat. No. 3,408,749 wherein the film or video tape is stopped as a question is presented by the film or video tape on the visual screen and loudspeaker, the correct answer to the question is read off the film or video tape and stored in a register of the control system (similar to the computer 10 shown in Figure 1) and a correct answer on the student response buttons (similar to the response buttons 16 shown in Figure 1) produces forward actuation of the film or video tape thereby presenting the next lesson. On the other hand, if the comparator portion of the control system (similar to the computer 10 shown in Figure 1) indicates that the student answer is incorrect, the comparator will provide control signals causing the film or video tape to be driven in the reverse direction together with a shifting to the corrective track. After the corrective track information has been presented to the student, the original or main series track is again projected and forward drive re-established.

The commencement of the succeeding portion of the main series is at the same longitudinal point of the tape (normally, but not necessarily, on the same track). If student responses have shown no need for auxiliary instruction, the tape proceeds in the same manner as if the branching provision were absent. If student responses have shown the need for auxiliary instruction, the video tape is moved first in one direction and then in the other (with appropriate switching accomplished by computer 10 and control receiver 11, of track selection) along a path which brings it back to the same point, with no substantial interruption whatever in the presentation, which is externally closely simulative of the reproduction of an ordinary tape bearing all the information presented in the usual forward sequence.

Persons skilled in the art will readily adapt the teachings of the invention to devices substantially differing in detail from those illustrated in the drawing and described above. Although a number of uses and variations have been set forth herein, the diversity of variants in the employment of the invention is obviously much greater than the example herein discussed. Accordingly, the scope of the protection to be afforded the invention should not be limited to the particular embodiments described herein, but should extend to all practice of the invention within the definitions of the appended claims and equivalents thereof.

What is claimed is:

1. A teaching system comprising:

a. a central video information storage medium of the type adapted for sequenced visual presentation of instructional information upon progressive sensing of said medium;
b. a central electronic data processing machine connected to said central video information storage medium and having said instructional information programmed into said machine, said data processing machine including control and logic portions for determining which instructional information is to be presented in accordance with the program and the response sent to the machine by a user;
c. at least one video telephone having a viewing screen thereon for the reception of said instructional information from said electronic data processing machine via said central video information storage medium, and including control means operatively connected to said video telephone permitting a user to send responses back to the electronic data processing machine; and
d. a transmission means between said video telephone and said electronic data processing machine whereby signals can be sent between the video telephone and the machine;

whereby responses sent by the control means of said video telephone to said data processing machine are used to determine which instructional information on said central video information storage medium is to be presented to the user.

2. A teaching system as described in claim 1, also including a control receiver unit operatively connected to said electronic data processing machine and said central video information storage medium for controlling the sending and reception of signals, and for translating the information sent from said data processing machine and said central video information storage medium into audio and visual signals delivered to the video telephone.

3. A teaching system as described in claim 1, in which said video telephone control means comprises a control panel operatively connected to said video telephone including buttons on said panel permitting a user to send responses back to the electronic data processing machine.

4. A teaching system as described in claim 1, wherein said central video information storage medium comprises a video tape recorder means operatively connected to respond to control signals from said electronic data processing machine so as to send pictorial and audio signals via said transmission means to said video telephone.

5. A teaching system as described in claim 4, in which said video tape recorder means comprises a central bank of pre-recorded reels of video tape connected to a buffer unit for transfer recording the audio and visual information from selected ones of said video tapes into said buffer unit, thereby permitting the pre-recorded reels in the central bank to be made available almost simultaneously to a large number of users.

6. A teaching system as described in claim 5, wherein said buffer unit includes a plurality of video tape reels for providing audio and visual information individually to a plurality of said video telephones, said central bank being activated to record information on one of said buffer reels in response to a control signal from the data processing machine indicating more than one demand for a particular pre-recorded reel.

7. A teaching system as described in claim 5, wherein said video tape recorder means includes reels or pre-recorded video tape in which a portion of the digital computer process control and answer signals are recorded on the same or adjacent tracks as the audio-visual (lesson) information.

8. A teaching system comprising:
a public telephone system including multiple transmission paths interconnecting a multiplicity of student subscriber stations and a central station, the paths having the capability of transmitting at frequency bandwidths sufficiently wide to transmit video pictures and audio signals adequate to produce acceptable pictures and accompanying voice communication via video telephone;
an electronic data processing machine at the central station programmed with various educational programs to be received in alpha-numeric form and audio and video form by any one of the following video telephones upon selection by a student subscriber of the video telephone;
an interface receiver between said data processing machine and the following video telephones for translating the information of the data processing machine into audio and video signals to be relayed to the following video telephones;
and a plurality of such student subscriber stations having terminal units each including:
a video telephone;
means for selecting an educational program at the central station; and
means for submitting questions to the central station for receiving answers therefrom.

9. A system as in claim 8 in which
the data processing station includes means for recording on a medium, such as tape, at said bandwidths, video-audio signals of educational programs for transmission to the video telephones of the student subscriber stations; and
means for causing the data processing machine to actuate the recording means to direct its video-audio signals to the video telephones; whereby the information storage capability of the data processing machine may be minimized.

10. A system as in claim 9 including:
branching means for the recording means.

* * * * *